(No Model.)
W. N. BLANCHARD.
EYEGLASSES.
No. 540,040. Patented May 28, 1895.
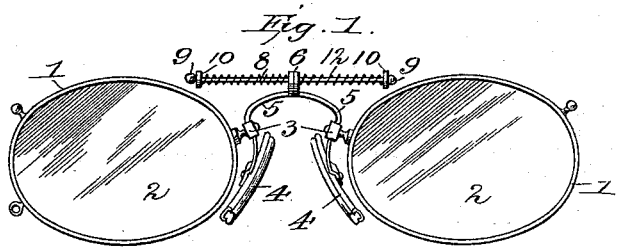
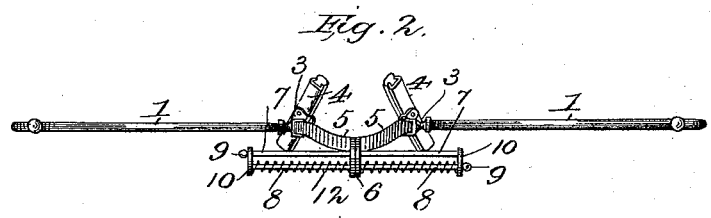
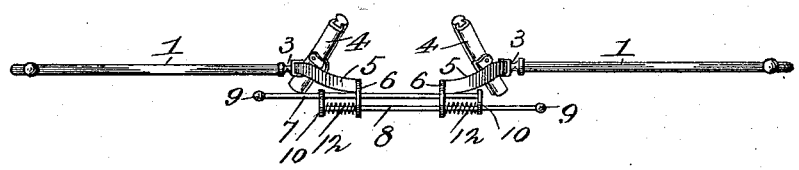
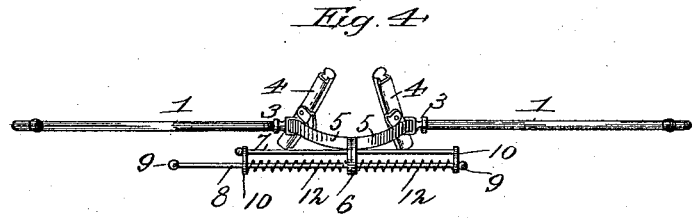
WITNESSES:
F. L. Ourand
W. L. Coombs
INVENTOR:
Willie N. Blanchard
Louis Jagger & Co.
Attorneys.

UNITED STATES PATENT OFFICE.

WILLIE N. BLANCHARD, OF SOUTHBRIDGE, MASSACHUSETTS, ASSIGNOR, BY MESNE ASSIGNMENTS, OF ONE-HALF TO SOLOMON E. BLANCHARD, OF SAME PLACE.

EYEGLASSES.

SPECIFICATION forming part of Letters Patent No. 540,040, dated May 28, 1895.

Application filed February 13, 1894. Serial No. 500,061. (No model.)

*To all whom it may concern:*

Be it known that I, WILLIE N. BLANCHARD, a citizen of the United States, and a resident of Southbridge, in the county of Worcester and State of Massachusetts, have invented certain new and useful Improvements in Eyeglasses; and I do hereby declare that the following is a full, clear, and exact description of the invention, which will enable others skilled in the art to which it appertains to make and use the same, reference being had to the accompanying drawings, which form a part of this specification.

My invention relates to improvements in eye glasses of that character or description in which the lenses may be moved laterally to and from each other in a straight line.

The object of the invention is to provide an improved construction of the same whereby I obtain superior advantages with respect to efficiency in operation.

The invention consists in the novel construction and combination of parts hereinafter fully described and claimed.

In the accompanying drawings, Figure 1 is a front view of a pair of eyeglasses constructed in accordance with my invention. Fig. 2 is a plan view on an enlarged scale to more fully illustrate the invention. Fig. 3 is a similar view showing the lenses distended. Fig. 4 is a plan view showing a somewhat modified construction.

In the said drawings the reference numeral 1 designates the circular or elliptical frame for holding the lenses 2, provided with lugs or posts 3, with which are connected the nose pieces 4. These parts may be of any ordinary or usual construction. Secured to the said posts are upwardly extending, inwardly curved arms 5, formed at their upper ends with lugs 6.

The numerals 7 and 8 designate two parallel rods, each of which is secured at or near its center to one of the lugs 6, so as to project laterally from each side thereof, and each rod passing loosely through an aperture in the lug to which the other rod is secured. These rods are provided at one end with a ball or head 9, while the other end of each rod is provided with a plate 10, having an aperture therein through which the other rod passes.

The numeral 12 denotes coiled springs encircling the rod 8, and bearing against the plates 10, and against the lugs 6. While I have shown two of these coiled springs, one may be employed if desired, and the rod 7 may also be provided with similar springs.

In the modification shown in Fig. 4, it will be seen that rod 8 is somewhat longer than rod 7, so that one end will project beyond the end of the latter.

The operation will be readily understood. The tendency of the springs is to draw the lenses of the eye glasses together until the lugs 6 meet each other. In adjusting the glasses to the nose the springs will yield allowing the lenses to spread apart or be distended in a straight line. It will be seen that as the arms 5 spread apart the lugs 6 will be correspondingly moved and the rods 7 and 8 be moved outward or in opposite directions, the rod secured to one lug moving in the aperture in the other lug. The coiled springs will hold the nose pieces in contact with the nose.

I am aware that heretofore eye-glasses have been constructed with upwardly extending arms provided with lugs, to which are respectively secured laterally extending rods, and the rod of one lug passing through an aperture in the other lug, and coiled springs interposed between the ends of said rods and the lugs. This construction, however, is objectionable, in that, owing to the necessity of making the rods very small and light they are extremely liable to become bent or broken. By my invention, the plates 10, to which the outer ends of the rods are secured, not only serve to brace and stiffen the latter so as to give them sufficient rigidity to prevent their being easily bent or broken, but also serve as guides to keep the rods in alignment.

Having thus described my invention, what I claim is—

In a pair of eye-glasses, the combination with the frames, the lenses, the nose-pieces and the posts, of the upwardly-extending, inwardly curved arms, having apertured lugs at their upper ends; the parallel rods secured, respectively, to said lugs, and the rod secured to one lug passing through the aperture in the other lug; the apertured plates secured to one end of each rod, through which said rods respectively pass, and the coiled springs interposed between said plates and lugs; substantially as and for the purpose specified.

In testimony that I claim the foregoing as my own I have hereunto affixed my signature in presence of two witnesses.

WILLIE N. BLANCHARD.

Witnesses:
JOSEPH N. LaREAU,
LOUIS BACHARD.